United States Patent [19]

Tanaka et al.

[11] Patent Number: 5,025,076

[45] Date of Patent: Jun. 18, 1991

[54] SILICONE-BASED FABRIC FINISHING AGENT

[75] Inventors: Masaki Tanaka; Hiroshi Ohashi; Yoshinobu Takahashi, all of Gunma, Japan

[73] Assignee: Shin-Etsu Chemical Co., Ltd., Tokyo, Japan

[21] Appl. No.: 315,879

[22] Filed: Feb. 27, 1989

[30] Foreign Application Priority Data

Feb. 27, 1988 [JP] Japan ................................. 63-45352

[51] Int. Cl.$^5$ ............................................. C08G 77/04
[52] U.S. Cl. ......................................... 528/33; 528/27; 528/38; 525/476; 525/477
[58] Field of Search ............................ 528/33, 27, 38; 525/476, 477

[56] References Cited

U.S. PATENT DOCUMENTS 4,652,618  3/1987  Sumida et al. ..................... 525/476
4,797,446  1/1989  Dietein et al. ......................... 528/38

Primary Examiner—Melvyn I. Marquis
Attorney, Agent, or Firm—Millen, White & Zelano

[57] ABSTRACT

A silicone-based fabric finishing agent which comprises: an aminoalkyl-substituted diorganopolysiloxane; a reaction product of an aminoalkyl-substituted organopolysiloxane and an epoxy-containing organic compound; a hydrolysis product of an epoxy-containing hydrolyzable organosilane coupound; and, optionally, an aminoalkyl-substituted organopolysiloxane having a specified viscosity, each in a specified proportion is particularly suitable for the softening treatment of waddings of synthetic fibers, e.g., polyester fibers, and advantageous over conventional silicone-based fabric treatment agents with respect to the excellent softness and smoothness of the treated wadding, which is freed from the problem of discoloration or yellowing caused in the course of the heat treatment and by the lapse of time, as well as the durability of these effects to withstand dry cleaning.

6 Claims, No Drawings

SILICONE-BASED FABRIC FINISHING AGENT

BACKGROUND OF THE INVENTION

The present invention relates to a silicone-based fabric finishing agent, more particularly, to a silicone-based fabric finishing agent suitable for a softening treatment of waddings of synthetic fibers advantageously freed from the drawback of yellowing of the wadding treated therewith by heating or by the lapse of time.

Waddings of synthetic fibers such as polyester fibers, acrylic fibers and the like are required to have good feeling of softness and smoothness so that it is usual that a wadding of a synthetic fiber are treated with a fabric finishing agent capable of imparting a desirable feeling of touch to the wadding treated therewith with. Various types of fabric softening agents have hitherto been proposed and used commercially, among which silicone-based ones are most important.

Known types of silicone-based fabric finishing agents suitable for the above mentioned application include a combination of an epoxy-containing organopolysiloxane and an amino-containing organopolysiloxane, a combination of an epoxy-containing organopolysiloxane and an amino-containing organic compound and a combination of an epoxy-containing organic compound and an amino-containing organopolysiloxane disclosed in Japanese Patent Publication No. 48-17514, a combination of a high-polymeric dimethylpolysiloxane and an aminoalkoxy silane disclosed in Japanese Patent Publication No. 51-37996, a combination of an epoxy-containing organopolysiloxane and an aminoalkoxy silane disclosed in Japanese Patent Publication Nos. 53-19715 and 53-19716 and so on. These prior art silicone-based fabric finishing agents are excellent with respect to the soft and pleasant feeling of touch or so-called feather-touch feeling imparted to the wadding treated therewith. However, these fabric finishing agents have a serious defect in common, viz., the wadding treated therewith is more or less subject to a phenomenon of yellowing when the wadding is heated during the treatment procedure or by the lapse of time after the treatment which greatly decreases the commercial value of the fabric material treated therewith so that it is eagerly desired in the fabric industry to develop a fabric finishing agent free from the problem of yellowing of the fabric material.

SUMMARY OF THE INVENTION

The present invention accordingly has an object to provide an organopolysiloxane composition suitable as a novel and improved fabric finishing agent which is free from the problem of discoloration or yellowing of the fabric materials, in particular, waddings of a synthetic fiber treated therewith.

The silicone-based fabric finishing agent of the invention comprises, in admixture:

(A) from 50 to 95 parts by weight of a diorganopolysiloxane having a viscosity in the range from 10,000 to 1,000,000 centistokes at 25° C. and having a substantially linear molecular structure represented by the general formula $$XO-(-SiR_2-O-)_m-(-SiZR-O-)_n-X, \quad (I)$$

in which each R is a monovalent hydrocarbon group having 1 to 20 carbon atoms, Z is an amino-substituted alkyl group represented by the general formula $-R^1-(-NH-CH_2CH_2-)_a-NR^2_2$, $R^1$ being an alkylene group having 1 to 10 carbon atoms, each $R^2$ being a hydrogen atom or a monovalent hydrocarbon group and the subscript a being zero or a positive integer not exceeding 4, each X is a hydrogen atom or a monovalent hydrocarbon group having 1 to 10 carbon atoms, the subscript m is a positive integer in the range from 800 to 2000 and the subscript n is a positive integer not exceeding 20, with the proviso that n/(m+n) is in the range from 0.0005 to 0.01;

(B) from 5 to 50 parts by weight of an organopolysiloxane which is a reaction product of
(B-a) an aminoalkyl-containing organopolysiloxane represented by the average unit formula $$Z_b R_c SiO_{(4-b-c)/2}, \quad (II)$$

in which Z and R each have the same meaning as defined above, the subscript b is a positive number not exceeding 1 and the subscript c is a positive number not exceeding 2, with the proviso that b+c is in the range from 1.9 to 2.1, and
(B-b) an epoxy-containing organic compound in an amount to provide from 0.01 to 20 moles of epoxy groups per mole of the amino-substituted alkyl groups denoted by Z in the reactant (B-a);

(C) up to 30 parts by weight of an aminoalkyl-containing organopolysiloxane having a viscosity in the range from 100 to 5,000 centistokes at 25° C. and represented by the average unit formula $$Z_b R_c SiO_{(4-b-c)/2}, \quad (II)$$

in which each symbol has the same meaning as defined above; and (D) a hydrolysis product of an epoxy-containing hydrolyzable organosilane compound in an amount in the range from 1 to 50% by weight based on the total amount of the components (A), (B) and (C).

DETAILED DESCRIPTION OF THE PREFERRED EMBODIMENTS

As is described above, the essential components in the inventive organopolysiloxane composition is the components (A), (B) and (D) with optional addition of the component (C) blended in the above specified proportion. This organopolysiloxane composition is very advantageous as a fabric finishing agent to impart various kinds of fabric materials and, in particular, waddings of not only synthetic fibers but also natural fibers with excellent touch feeling of softness and smoothness as well as voluminosity much superior to that obtained with conventional silicone-based fabric finishing agents. The inventive fabric finishing agent is applicable to any fabric materials including, in addition to waddings, knit and woven fabrics of all kinds of fibers including mixed-spun woven fabrics, for example.

In the following, each of the components comprised in the inventive composition is described in detail.

The component (A) is a diorganopolysiloxane having a viscosity in the range from 10,000 to 1,000,000 centistokes at 25° C. and having a substantially linear molecular structure represented by the general formula $$XO-(-SiR_2-O-)_m-(-SiZR-O-)_n-X, \quad (I)$$

in which each R is a monovalent hydrocarbon group having 1 to 20 carbon atoms, Z is an amino-substituted alkyl group represented by the general formula —R$^1$—(—NH—CH$_2$CH$_2$—)$_a$—NR$^2{}_2$, R$^1$ being an alkylene group having 1 to 10 carbon atoms, each R$^2$ being a hydrogen atom or a monovalent hydrocarbon group and the subscript a being zero or a positive integer not exceeding 4, each X is a hydrogen atom or a monovalent hydrocarbon group having 1 to 10 carbon atoms, the subscript m is a positive integer in the range from 800 to 2000 and the subscript n is a positive integer not exceeding 20 with the proviso that n/(m+n) is in the range from 0.0005 to 0.01.

The group denoted by R in the formula (I) is a monovalent hydrocarbon group having 1 to 20 carbon atoms, exemplified by alkyl groups such as methyl, ethyl, propyl and butyl groups, alkenyl groups such as vinyl and allyl groups, aryl groups such as phenyl and tolyl groups and cycloalkyl groups such as cyclohexyl group. The hydrogen atoms in these hydrocarbon groups can be partly or wholly replaced with substituents such as halogen atoms, cyano groups and the like to give a substituted hydrocarbon group exemplified by chloromethyl, 3,3,3-trifluoropropyl and 2-cyanoethyl groups. Different kinds of these unsubstituted and substituted monovalent hydrocarbon groups can be contained in the diorganopolysiloxane. X in the general formula (I) is a hydrogen atom or a monovalent hydrocarbon group having 1 to 10 carbon atoms so that the diorganopolysiloxane molecule is terminated at each molecular chain end with a hydroxy group or an alkoxy group bonded to the terminal silicon atom. These hydroxy and/or alkoxy groups are reactive with the hydroxy groups in the component (D) to form a crosslinked structure of the coating film on the fibers so as to increase the durability of the fabric finishing effect of the inventive fabric finishing agent.

The group denoted by Z in the general formula (I) is an amino-substituted alkyl group represented by the general formula —R$^1$—(—NH—CH$_2$CH$_2$—)$_a$—NR$^2{}_2$, in which R$^1$ is an alkylene group having 1 to 10 carbon atoms, R$^2$ has the same meaning as defined above and the subscript a is zero or a positive integer not exceeding 4. The group denoted by R$^1$ is exemplified typically by methylene, ethylene, propylene and butylene groups and each of the groups denoted by R$^2$ is a hydrogen atom or a monovalent hydrocarbon group having 1 to 20 carbon atoms. The subscripts m and n in the general formula (I) are each a positive integer of 800 to 2000 and 1 to 20, respectively, so that the diorganopolysiloxane molecule has at least one amino-substituted group denoted by Z. It is preferable that the ratio n/(m+n) is in the range from 0.0005 to 0.01. When this molar ratio is too large, the problem of yellowing of the fabric material treated with the fabric finishing agent cannot be solved completely. Examples of the group denoted by Z include 3-aminopropyl group, 4-aminobutyl group, 5-aminopentyl group, 3-[N-(2-aminoethyl)amino]propyl group, 3-[N-2-aminoethyl)aminoethyl]aminopropyl group and 4-aminophenyl group.

The values of the subscript m and n determine the average degree of polymerization of the diorganopolysiloxane of the general formula (I) which in turn is a determinant of the viscosity of the organopolysiloxane. Thus, the diorganopolysiloxane has a viscosity in the range from 10,000 to 1,000,000 centistokes at 25° C. or, preferably, from 10,000 to 100,000 centistokes at 25° C. When the average degree of polymerization of the diorganopolysiloxane is too low, the fabric finishing agent prepared therefrom cannot impart full smoothness to the fabric material treated with the composition. When the viscosity of the diorganopolysiloxane is too high, on the other hand, certain difficulties are caused in the preparation of a fabric finishing agent by emulsifying or dissolving the same in a liquid medium.

The aminoalkyl-containing diorganopolysiloxane of the general formula (I) as the component (A) is prepared by a known method in which, assuming that the groups denoted by R are all methyl groups, for example, octamethyl cyclotetrasiloxane as a source material of the SiR$_2$—O— units is blended with a hydrolysis product of an aminoalkyl-containing hydrolyzable organosilane compound such as 3-aminopropyl methyl dimethoxy silane and 3-[N-(2-aminoethyl)amino]propyl methyl dimethoxy silane and the mixture is subjected to a siloxane rearrangement equilibration reaction by heating in the presence of a strongly basic compound such as potassium hydroxide as a catalyst. When the hydrolysis of the aminoalkyl-containing hydrolyzable organosilane compound is complete, the molecular chain ends of the diorganopolysiloxane are blocked with silanolic hydroxy groups whereas, when the hydrolysis thereof is partial, the terminal groups are silicon-bonded alkoxy groups.

The component (B) in the inventive composition is a reaction product of (B-a) an aminoalkyl-containing organopolysiloxane and (B-b) an epoxy group-containing organic compound. The organopolysiloxane as the reactant (B-a) is represented by the average unit formula

$$Z_bR_cSiO_{(4-b-c)/2}, \tag{II}$$

in which Z and R each have the same meaning as defined above, the subscript b is a positive number not exceeding 1 and the subscript c is a positive number not exceeding 2.1 with the proviso that b+c is in the range from 1.9 to 2.1. It is optional that a part of the groups denoted by R are substituted hydrocarbon groups obtained by replacing a part or all of the hydrogen atoms in the hydrocarbon groups with halogen atoms and the like. It is further optional that the group denoted by R contains a polyoxyalkylene structure therein. However, it is preferable that at least 50% by moles of the groups denoted by R are methyl groups.

The subscripts b and c in the average unit formula (II) are each a positive number not exceeding 1 and not exceeding 2, respectively, with the proviso that b+c is in the range from 1.9 to 2.1. This limitation means that the organopolysiloxane as the reactant (B-a) has a substantially linear molecular structure. The terminal groups at the molecular chain ends of such linear molecules are usually trialkylsilyl groups although the terminal silicon atom can be bonded to a hydroxy group or an alkoxy group such as methoxy and ethoxy groups.

The aminoalkyl-containing organopolysiloxane as the reactant (B-a) is prepared by a known method in which, assuming that all of the groups denoted by R are methyl groups, a hydrolysis product of an aminoalkyl-containing hydrolyzable organosilane compound such as 3-aminopropyl methyl dimethoxy silane and 3-[N-(2-aminoethyl)amino]propyl methyl dimethoxy silane is mixed with octamethyl cyclotetrasiloxane and hexamethyl disiloxane and the mixture is subjected to a siloxane rearrangement equilibration reaction by heating in the presence of a strongly basic compound such as potassium hydroxide as a catalyst. Although the aminoalkyl-containing organosiloxane units obtained from the above mentioned silane compounds are expressed by the unit formula (—SiRZ—O—), siloxane units of other types are also suitable including the units of (—SiZ$_2$—O—) and (ZSiO$_{1.5}$), R and Z each having the same meaning as defined above.

Although the aminoalkyl-containing organopolysiloxane as the reactant (B-a) may have a viscosity in a wide range from 10 to 1,000,000 centistokes at 25° C., it is preferable that the viscosity is in the range from 100 to 100,000 centistokes at 25° C. from the standpoint of workability in the reaction with the reactant (B-b) described below.

The reactant (B-b) to be reacted with the above described reactant (B-a) is an epoxy group-containing organic compound which is preferably a monoepoxy compound represented by the general formula Ep—R$^3$ or Ec—R$^3$, in which Ep and Ec denote an epoxy group and a 3,4-epoxy cyclohexyl group, respectively, and R$^3$ denotes an organic group free from epoxy groups. Preferably, the group denoted by R$^3$ is a monovalent organic group having a linear or branched structure. Examples of suitable epoxy group-containing organic compounds include glycidyl alcohol, glycidyl carbinol (glycidylmethyl alcohol), Ep—CH$_2$—O—(—CH$_2$CH$_2$—O—)$_d$—H, in which d is a positive integer, glycidyl allyl ether, glycidyl methacrylate, epichlorohydrin, 1-vinyl-3,4-epoxy cyclohexane and the like.

The reaction of the reactants (B-a) and (B-b) is performed by blending the reactants and heating the mixture so as to block one of the active hydrogen atoms in the amino group with the epoxy compound according to the following reaction equation:

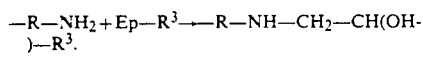

The amount of the epoxy compound as the reactant (B-b) is such that from 0.01 to 20 moles, preferably, from 0.1 to 10 moles of the epoxy groups are provided per mole of the nitrogen atoms in the reactant (B-a).

The amount of the component (B) in the inventive fabric finishing agent is in the range from 5 to 50 parts by weight when the amount of the component (A) is in the range from 50 to 95 parts by weight.

The component (C) in the inventive fabric finishing agent is a liquid aminoalkyl-containing organopolysiloxane which may be the same one as the reactant (B-a) to form the component (B) by the reaction with the epoxy-containing organic compound. This component is optional in the inventive composition and can be omitted when a composition composed of the other essential components is capable of imparting a satisfactory feeling of softness and smoothness to the fabric material treated therewith although addition of the component (C) is desirable in order to obtain further improvements. This liquid organopolysiloxane preferably has a viscosity in the range from 100 to 5000 centistokes at 25° C. The amount of the component (C), when added, should not exceed 30 parts by weight assuming that the amounts of the components (A) and (B) are in the ranges of 50 to 95 parts by weight and 5 to 50 parts by weight, respectively.

The component (D) in the inventive fabric finishing agent is a hydrolysis condensation product of an epoxy group-containing hydrolyzable organosilane compound represented by the general formula $G_pR_qSi(OR^4)_{4-p-q}$, in which G is an epoxy group-containing monovalent organic group, R is a monovalent hydrocarbon group having 1 to 20 carbon atoms, R$^4$ is a monovalent hydrocarbon group having 1 to 6 carbon atoms, the subscript p is 1 or 2 and the subscript q is zero or 1 with the proviso that p+q is 1 or 2. Examples of such an organosilane compound include 3-glycidyloxypropyl trimethoxy silane, 3-glycidyloxypropyl methyl dimethoxy silane, 2-(3,4-epoxy-cyclohexyl) trimethoxy silane, 2-(3,4-epoxy-cyclohexyl)ethyl dimethoxy silane, 3-glycidyloxypropyl triethoxy silane, 3-glycidyloxypropyl methyl diethoxy silane, 2-(3,4-epoxy-cyclohexyl)ethyl triethoxy silane, 2-(3,4-epoxy-cyclohexyl)ethyl methyl diethoxy silane and the like. These organosilane compounds can be used either singly or as a mixture of two kinds or more according to need. The hydrolysis-condensation reaction of the silane compound or compounds can be performed by a known procedure. For example, the silane compound or a mixture of the silane compounds is added dropwise to an acidic or alkaline aqueous medium kept at 5° to 50° C. under agitation to effect the hydrolysis reaction followed by aging to effect the condensation reaction between the hydroxy groups in the hydrolysis product and stripping of the by-product alcohol and water.

The amount of the component (D) in the inventive composition is in the range from 1 to 50% by weight or, preferably, from 10 to 30% by weight based on the total amount of the components (A), (B) and, when added, (C). When the amount of the component (D) is too small, no improvement can be obtained in respect of the durability in the effect of fabric finishing by the addition thereof. When the amount of the component (D) is too large, on the other hand, the fabric material treated with the fabric finishing agent is imparted with somewhat stiff feeling of touch.

The fabric finishing agent of the invention can be prepared by uniformly blending the above described components (A), (B), (D) and, optionally, (C) in a proportion specified above. It is preferable with respect to the convenience in the use of the inventive fabric finishing agent that the composition is prepared in the form of a solution in an organic solvent or in the form of an emulsion in an aqueous medium. Suitable organic solvents include aromatic solvents such as benzene, toluene and xylene, petroleum-based solvents such as technical-grade gasoline and kerosene, chlorinated hydrocarbon solvents such as trichloroethylene, perchloroethylene and trichloroethane and various kinds of fluorocarbon solvents. Suitable emulsifying agents used in the preparation of an aqueous emulsion of the inventive composition include non-ionic surface active agents such as polyoxyethylene alkyl ether and polyoxyethylene alkylphenyl ether and cationic surface active agents such as quaternary ammonium salts and ethylene oxide adducts of a quaternary ammonium salt. It is preferable that the aqueous emulsion of the inventive compositions is admixed with an organic acid, such as formic acid, acetic acid and glycolic acid, to neutralize at least a part of the amino groups so as to improve the stability of the aqueous emulsion according to need. It is further optional that the inventive composition in the form of an organic solution or an aqueous emulsion is admixed with an organic acid salt of a metal such as zinc, titanium, aluminum, tin, zirconium and the like as a curing catalyst.

Treatment of a fabric material with the inventive composition as a finishing agent is performed by soaking the fabric material with the inventive composition in the form of an organic solution or an aqueous emulsion in a conventional method such as dipping, spraying or using an oiling roller. The amount of the inventive composition deposited on the fabric material is in the range from 0.1 to 2.0% by weight or, preferably, from 0.2 to 1.0% by weight, based on the fabric material excepting the volatile matter contained therein. The composition of the fabric finishing agent deposited on the fabric material can be crosslinked and fixed to the fiber surface by subjecting the treated fabric material after drying to a heat treatment at a temperature of 100° to 200° C. for 1 to 30 minutes.

The inventive composition as a fabric finishing agent is applicable to fabric materials of any kind of fibers including natural and synthetic fibers although a great improvement of the fabric treatment can be obtained over conventional fabric finishing agents when the inventive fabric finishing agent is used for the treatment of fabric materials of synthetic fibers such as polyester fibers, acrylic fibers, nylon fibers, polypropylene fibers and the like so that the treated fabric material can be imparted with greatly improved feather-touch feeling of softness and smoothness. Advantageously different from fabric materials treated with conventional fabric finishing agents, the fabric material treated with the inventive composition is outstandingly freed from the drawbacks of discoloration and yellowing caused in the course of a heat treatment or by the lapse of time after treatment.

In the following, the fabric finishing agent of the present invention is described in more detail by way of examples in which the fabric finishing agents prepared according to the invention or for comparative purpose were evaluated by examining the wadding of polyester fibers treated therewith for the softness and smoothness, accelerated yellowing and resistance to withstand dry cleaning according to the following procedure and criteria for the respective items.

Test of softness and smoothness

The feeling of touch of the treated polyester wadding was evaluated organoleptically to give the results in four ratings.
A: excellent feather-touch feeling
B: good feather-touch feeling
C: somewhat stiff and less slippery feeling of touch
D: stiff feeling of touch without no slipperiness, Test of accelerated yellowing The polyester wadding after treatment with the fabric finishing agent was heated at 200° C. for 30 minutes in air and the degree of yellowing thereof was visually examined and recorded in three ratings.
A: no yellowing noted
B: slight but noticeable yellowing
C: strong yellowing.

Resistance against dry cleaning

The polyester wadding after treatment with the fabric finishing agent was subjected to dry cleaning according to the procedure specified in JIS L 0860 by using perchloroethylene combined with an anionic surface active agent and a non-ionic saurface active agent as the cleaning liquid followed by the tests of softness and smoothness and accelerated yellowing in the same manner as described above.

EXAMPLES

Five aminoalkyl group-containing organopolysiloxanes S-I, S-II, S-III, S-IV and S-V were prepared each by introducing, into a glass flask of 1 liter capacity, octamethyl cyclotetrasiloxane, referred to as the starting material (a) hereinbelow, a 1,3,5,7-tetramethyl-1,3,5,7-tetra(aminoalkyl) cyclotetrasiloxane of which the aminoalkyl group was 3-[N-(2-aminoethyl)amino]-propyl group or 3-aminopropyl group, referred to as the starting material (b-1) or (b-2), respectively, hereinbelow, and an $\alpha,\omega$-dihydroxy eicosamethyl decasiloxane, 3-[N-(2-aminoethyl)amino]propyl methyl dimethoxy silane, 3-aminopropyl methyl diethoxy silane or hexaeicosamethyl dodecasiloxane, referred to as the starting material (c-1), (c-2), (c-3) or (c-4), respectively, hereinbelow, each in an amount indicated in Table 1 below together with 0.04 g of potassium hydroxide as a catalyst and the mixture was heated at 140° C. for 6 hours under a stream of nitrogen gas to effect the siloxane rearrangement polymerization reaction. After completion of the reaction, the reaction mixture was admixed with 0.3 g of ethylene chlorohydrin and agitated for 2 hours at 100° C. to neutralize the potassium hydroxide followed by stripping of volatile matter by heating at 130° C. under a reduced pressure of 10 mmHg to give the respective aminoalkyl group-containing organopolysiloxanes S-I to S-V expressed by the structural formulas given below, in which the symbols Me, Et, A and B denote methyl, ethyl, 3-[N-(2-aminoethyl)amino]propyl and 3-aminopropyl groups, respectively.

S-I: $HO-(SiMe_2-O-)_{6\text{-}99}-(-SiAMe-O-)-SiMe_2-OH$

S-II: $MeO-(-SiMe_2-O-)_{300}-(-SiAMe-O-)_2-Me$

S-III: $EtO-(-SiMe_2-O-)_{1000}-(-SiBMe-O-)_{10}-Et$

S-IV: $Me-(-SiMe_2-O-)_{101}-(-SiAMe-O-)_2-SiMe_3$

S-V: $Me-(-SiMe_2-O-)_{501}-(-SiBMe-O-)_5-SiMe_3$.

Table 1 below also shows the content of non-volatile matter in % left after heating at 105° C. for 3 hours, viscosity at 25° C. in centistokes and amine equivalent in g/mole in each of the thus prepared organopolysiloxanes.

TABLE 1

| Organopolysiloxane | S-I | S-II | S-III | S-IV | S-V |
|---|---|---|---|---|---|
| Starting materials taken,g | | | | | |
| (a) | 491.2 | 491.9 | 494.5 | 422.5 | 480.3 |
| (b-1) | 1.5 | 3.5 | — | 20.3 | — |
| (b-2) | — | — | 4.7 | — | 7.7 |
| (c-1) | 7.3 | — | — | — | — |
| (c-2) | — | 4.6 | — | — | — |
| (c-3) | — | — | 0.9 | — | — |
| (c-4) | — | — | — | 57.2 | 12.0 |
| Properties of organopolysiloxane | | | | | |
| Non-volatile matter, % | 97.5 | 96.5 | 96.3 | 98.8 | 97.2 |
| Viscosity, centistokes | 15,500 | 2,700 | 73,800 | 220 | 6,200 |
| Amino equivalent, g/mole | 26,000 | 5,600 | 11,200 | 2,000 | 7,600 |

In the next place, 200 g of the aminoalkyl group-containing organopolysiloxane S-II prepared above, 3.9 g of glycidyl alcohol and 300 g of toluene were introduced into a glass flask of 1 liter capacity equipped with a stirrer, thermometer, reflux condenser and nitrogen gas inlet and the mixture was agitated for 5 hours at 60° C. under a stream of nitrogen gas to effect the reaction, followed by stripping of the volatile matter at 80° C. under reduced pressure to give a reaction product, which is referred to as the organopolysiloxane S-VI hereinbelow, having a viscosity of 9,300 centistokes at 25° C. and containing 97.6% of the non-volatile matter by heating at 105° C. for 3 hours. The amount of the glycidyl alcohol corresponded to 1.5 moles per mole of the nitrogen atoms in the organopolysiloxane S-II.

Another epoxy-reacted aminoalkyl group-containing organopolysiloxane, referred to as the organopolysiloxane S-VII hereinbelow, was prepared in the same manner as above excepting replacement of the organopolysiloxane S-II with the same amount of the organopolysiloxane S-IV and 3.9 g of glycidyl alcohol with 6.3 g of 3,4-epoxy vinylcyclohexane. The amount of the epoxy compound corresponded to 0.5 mole per mole of the nitrogen atoms in the organopolysiloxane S-IV. The organopolysiloxane S-VII as the reaction product had a viscosity of 630 centistokes at 25° C. and contained 99.0% of the non-volatile matter as determined by heating at 105° C. for 3 hours.

Separately, 367.3 g of water and 3.7 g of 35% hydrochloric acid were introduced into a glass flask of 1 liter capacity equipped with a stirrer, thermometer, reflux condenser and dropping funnel and a mixture of 243.8 g of 3-glycidyloxypropyl trimethoxy silane and 256.2 g of 3-glycidyloxypropyl methyl diethoxy silane was added dropwise into the diluted hydrochloric acid in the flask under agitation at room temperature over a period of 2 hours to effect the hydrolysis reaction of the silanes followed by aging at 50° C. for 4 hours to effect the condensation reaction. After completion of the reaction, the hydrochloric acid in the reaction mixture was neutralized by adding propylene oxide and the volatile matters including the by-product alcohols and water were removed therefrom by stripping at 80° C. under reduced pressure to give a liquid product having a viscosity of 2,300 centistokes at 25° C. and containing 99.3% of non-volatile matter, of which the epoxy equivalent was 190 g/mole. This product is referred to as the organopolysiloxane S-VIII hereinbelow.

Another hydrolysis-condensation product of an epoxy group-containing organosilane compound, referred to as the organopolysiloxane S-IX hereinbelow, was prepared in the same manner as above except that the mixture of 3-glycidyloxypropyl trimethoxy silane and 3-glycidyloxypropyl methyl diethoxy silane was replaced with a mixture of 49.6 g of 2-(3,4-epoxy cyclohexyl)ethyl trimethoxy silane and 450.4 g of 3-glycidyloxypropyl methyl diethoxy silane. The liquid product had a viscosity of 720 centistokes at 25° C. and contained 98.9% of non-volatile matter, of which the epoxy equivalent was 210 g/mole.

Nine aqueous organopolysiloxane emulsions, referred to as E-I, E-II, E-III, E-IV, E-V, E-VI, E-VII, E-VIII and E-IX hereinbelow, were prepared each by emulsifying 300 g of the organopolysiloxanes S-I, S-II, S-III, S-IV, S-V, S-VI, S-VII, S-VIII and S-IX, respectively, in a solution of 50 g of a polyoxyethylene nonylphenyl ether as an emulsifying agent in 650 g of water using a homomixer. For comparison, another organopolysiloxane emulsion, referred to as E-X hereinbelow, was prepared by emulsifying 300 g of octamethyl cyclotetrasiloxane in 680 g of water containing 10 g of dodecyl benzene sulfonic acid under agitation using a high-speed stirrer at 60° C. for 16 hours to effect the polymerization reaction followed by neutralization to a pH of 7.0 by the addition of a 10% aqueous solution of sodium carbonate. The thus obtained emulsion E-X contained 27% by weight of non-volatile matter as determined by heating at 105° C. for 3 hours. The organopolysiloxane in this emulsion was a dimethyl polysiloxane terminated at each molecular chain end with a silanolic hydroxy group.

Treatment baths No. 1 to No. 9 for fabric finishing were prepared each by diluting a combination of three or four of the above prepared emulsions E-I to E-IX with water. The formulation of each bath is shown below in % by weight of the respective emulsions, the balance being water. Another treatment bath No. 10 was prepared for comparative purpose by diluting 10.0 parts by weight of the emulsion E-X, 1.0 part by weight of 3-[N-(2-aminoethyl)amino]propyl methyl dimethoxy silane and 1.0 part by weight of a DBTDL emulsion, which was a emulsion composed of 10.0% by weight of dibutyl tin dilaurate and 2.0% by weight of a polyoxyethylene nonylphenyl ether in 88.0% by weight of water, with 88.0 parts by weight of water.

Formulation of treatment baths No. 1 to No. 9
No. 1: E-I 9.0%; E-VI 1.0%; and E-VIII 1.0%
No. 2: E-I 7.0%; E-IV 2.0%; E-VI 1.0%; and E-VIII 1.0%
No. 3: E-I 5.0%; E-IV 4.0%; E-VI 1.0%; and E-VIII 1.0%
No. 4: E-I 7.0%; E-IV 2.0%; E-VI 1.0%; and E-IX 1.0%
No. 5: E-I 7.0%; E-IV 2.0%; E-VII 1.0%; and E-VIII 1.0%
No. 6: E-I 7.0%; E-II 2.0%; E-VI 1.0%; and E-VIII 1.0%
No. 7: E-III 7.0%; E-IV 2.0%; E-VI 1.0%; and E-VIII 1.0%
No. 8: E-II 7.0%; E-IV 2.0%; E-VI 1.0%; and E-VIII 1.0%
No. 9: E-I 7.0%; E-V 2.0%; E-VI 1.0%; and E-VIII 1.0%.

A wadding lump of 6-denier polyester staples of 64 mm fiber length was dipped in and soaked with one of the thus prepared treatment baths No. 1 to No. 10 and centrifuged to remove the excess volume of the liquid, so that the amount of the fabric finishing agent as solids deposited on the polyester staples was 1.0% by weight, followed by a heat treatment at 150° C. for 10 minutes. The polyester waddings treated in this manner were each subjected to the test for softness and smoothness, accelerated yellowing and resistance to withstand dry cleaning according to the procedures described before to give the results shown in Table 2 below, which also contains the results of testing obtained with the same wadding before treatment as a control.

TABLE 2

| Treatment bath No. | Softness & smoothness | Accelerated yellowing | Dry cleaning resistance |
|---|---|---|---|
| 1 | B | A | A |
| 2 | A | A | A |
| 3 | B | A-B | A |
| 4 | A | A | A |
| 5 | A | A | A |
| 6 | A | A | A |
| 7 | A | A | A |
| 8 | C | A | A |
| 9 | B | A | A |
| 10 | C | C | B |
| Control | D | A | — |

What is claimed is:

1. A silicone-based fabric finishing agent which comprises, in admixture:

(A) from 50 to 95 parts by weight of a diorganopolysiloxane having a viscosity in the range from 10,000 to 1,000,000 centistokes at 25° C. and having a substantially linear molecular structure represented by the general formula $$XO-(-SiR_2-O-)_m-(-SiZR-O-)_n-X,$$

in which each R is a monovalent hydrocarbon group having 1 to 20 carbon atoms, Z is an amino-substituted alkyl group represented by the general formula $-R^1-(-NH-CH_2CH_2-)_a-NR^2_2$, $R^1$ being an alkylene group having 1 to 10 carbon atoms, each $R^2$ being a hydrogen atom or a monovalent hydrocarbon group and the subscript a being zero or a positive integer not exceeding 4, each X is a hydrogen atom or a monovalent hydrocarbon group having 1 to 10 carbon atoms, the subscript m is a positive integer in the range from 800 to 2000 and the subscript n is a positive integer not exceeding 20 with the proviso that n/(m+n) is in the range from 0.0005 to 0.01;

(B) from 5 to 50 parts by weight of an organopolysiloxane which is a reaction product of (B-a) an aminoalkyl-containing organopolysiloxane represented by the average unit formula $$Z_bR_cSiO_{(4-b-c)/2},$$

in which Z and R each have the same meaning as defined above, the subscript b is a positive number not exceeding 1 and the subscript c is a positive number not exceeding 2 with the proviso that b+c is in the range from 1.9 to 2.1, and (B-b) an epoxy-containing organic compound in an amount to provide from 0.01 to 20 moles of epoxy groups per mole of the amino-substituted alkyl groups denoted by Z in the reactant (B-a);

(C) up to 30 parts by weight of an aminoalkyl-containing organopolysiloxane having a viscosity in the range from 100 to 5,000 centistokes at 25° C. and represented by the average unit formula $$Z_bR_cSiO_{(4-b-c)/2},$$

in which each symbol has the same meaning as defined above; and (D) a hydrolysis product of an epoxy-containing hydrolyzable organosilane compound in an amount in the range from 1 to 50% by weight based on the total amount of the components (A), (B) and (C).

2. The silicone-based fabric finishing agent as claimed in claim 1 wherein at least 50% by moles of the groups denoted by R in the reactant (B-a) are methyl groups.

3. The silicone-based fabric finishing agent as claimed in claim 1 wherein the epoxy-containing organic compound as the reactant (B-b) is selected from the group consisting of glycidyl alcohol, glycidylmethyl alcohol, $Ep-CH_2-O-(-CH_2CH_2-O-)_d-H$, in which Ep is an epoxy group and d is a positive integer, glycidyl allyl ether, glycidyl methacrylate, epichlorohydrin and 1-3,4-epoxy vinylcyclohexane.

4. The silicone-based fabric finishing agent as claimed in claim 1 wherein the epoxy-containing hydrolyzable organosilane compound, from which the component (D) is prepared by hydrolysis, is selected from the group consisting of 3-glycidyloxypropyl trimethoxy silane, 3-glycidyloxypropyl methyl dimethoxy silane, 2-(3,4-epoxy cyclohexyl)ethyl trimethoxy silane, 2-(3,4-epoxy cyclohexyl)ethyl dimethoxy silane, 3-glycidyloxypropyl triethoxy silane, 3-glycidyloxypropyl methyl diethoxy silane, 2-(3,4-epoxy cyclohexyl)ethyl triethoxy silane and 2-(3,4-epoxy cyclohexyl)ethyl methyl diethoxy silane.

5. The silicone-based fabric finishing agent as claimed in claim 1 which contains component (C).

6. The silicone-based fabric finishing agent as claimed in claim 1, wherein component (A) has a viscosity of from 10,000 to 100,000 centistokes at 25° C.; wherein at least 50% by moles of the groups denoted by R in the reactant (B-a) are methyl groups; and wherein component (D) is present therein in the range of 10 to 30% by weight of components (A), (B) and (C) and is selected from the group consisting of 3-glycidyloxypropyl trimethoxy silane, 3-glycidyloxypropyl methyl dimethoxy silane, 2-(3,4-epoxy cyclohexyl)ethyl trimethoxy silane, 2-(3,4-epoxy cyclohexyl)ethyl dimethoxy silane, 3-glycidyloxypropyl triethoxy silane, 3-glycidyloxypropyl methyl diethoxy silane, 2-(3,4-epoxy cyclohexyl)ethyl triethoxy silane and 2-(3,4-epoxy cyclohexy)ethyl methyl diethoxy silane.

* * * * *